United States Patent [19]

Beauvais

[11] Patent Number: 4,461,943
[45] Date of Patent: Jul. 24, 1984

[54] PROCESS FOR FORMING WELDED PREPAINTED METAL APPLIANCE CABINET WALLS

[75] Inventor: Rene G. Beauvais, Bay City, Mich.

[73] Assignee: RWC Inc., Bay City, Mich.

[21] Appl. No.: 387,929

[22] Filed: Jun. 14, 1982

[51] Int. Cl.³ .................... B23K 11/14; F25D 23/06
[52] U.S. Cl. .................................. 219/93; 219/86.9; 312/214
[58] Field of Search ............... 312/257 SM, 100, 102, 312/214; 219/93, 91.21, 91.2, 86.9

[56] References Cited

U.S. PATENT DOCUMENTS

| 1,020,056 | 3/1912 | Rietzel | 219/93 |
| 1,085,769 | 2/1914 | Thomson | 219/91.2 |
| 4,223,965 | 9/1980 | Palandrani | 312/100 |

FOREIGN PATENT DOCUMENTS 2471250  6/1981  France .............................. 219/91.2

*Primary Examiner*—Roy N. Envall, Jr.
*Assistant Examiner*—Alfred S. Keve
*Attorney, Agent, or Firm*—Learman & McCulloch

[57] ABSTRACT

A process for forming metal walls for prepainted metal cabinets and the like, such as by welding a galvanized back panel to a prepainted metal refrigerator-freezer cabinet wrapper painted only on the exterior wall surface thereof, and wherein flange sections functioning as marginal edge portions of the wall are folded over from the wrapper side walls. These flange sections are deformed to form recessed inwardly projecting bead portions therein along the edge portions, with paint either removed from the contact surfaces of the interiorly facing bead portions or not present thereon because of the manner in which the flange is formed. A back panel, with projecting bead portions arranged along the edges thereof which face exteriorly, is disposed with its edges lapping the flange portions of the wrapper sufficiently to cover bead portions thereon, with the beads in the panel projecting toward and in contact with the oppositely projecting beads of the flange section. A pair of series connected electrodes are then utilized to apply the welding current, one electrode being in contact with the bead surface on the flanges of the wrapper and the other being in contact with the wall of the panel opposite a bead portion formed therein.

15 Claims, 6 Drawing Figures

PROCESS FOR FORMING WELDED PREPAINTED METAL APPLIANCE CABINET WALLS

BACKGROUND OF THE INVENTION

This invention relates to the production line manufacture of cabinets for such products as refrigerators, freezers, and composite refrigerator-freezers, for example, wherein the outer shells or wrappers are prepainted on one face thereof at the time they are introduced to the manufacturing line. The use of prepainted sheet material saves the considerable cost of later painting the formed cabinet, and, because of the considerable interest these days in the construction of refrigerators, freezers, ovens and the like by manufacturers of such equipment in high-speed production lines, it has become necessary to provide a reliable, economical process to permit the welding of parts such as the galvanized back panel and deck, directly to the prepainted shell or wrapper of the particular appliance cabinet being manufactured.

The use of a welding process, as opposed to a clinching and/or staking process, permits the formation of a more rigid cabinet for subsequent fabrication and assembly, and a product free of external blemishes.

One of the prime objects of the present invention is to provide an improved method of forming prepainted metal cabinets which are painted only on the exterior wall surface thereof, and which may have some non-painted galvanized parts, such as back panels which are required to be secured to the cabinet wrapper.

A further object of the invention is to provide an improved process for fabricating such cabinets or shells which forms a more rigid cabinet and offers a superior product which is free of the external markings characteristic of the clinching and/or staking method which has been used.

Still another object of the invention is to provide a high production process which achieves the welding of galvanized back panels, for instance, to the outer shell wrapper in a manner which leaves the product free of external burn marks or blemishes.

SUMMARY OF THE INVENTION

The process is involved with the formation of folded over flange sections on the cabinet wrapper which function as the marginal edge portions of a wall. The flanges are preferably reversely bent to provide flange portions in at least a double wall, and with the sections thereof in facial contact. As little material is used as is possible for the particular cabinet which is being fabricated, in the interests of the economy of manufacture of large numbers of such cabinets in high speed production lines. Longitudinal bead projections are formed in the reversely turned flange sections, which in the preferred method have inwardly facing painted portions, and are so formed that these beads are interiorly facing and spaced from the companion flange section. This procedure is easily effected in a roll mill and thereafter, the bead edges can be wire-brushed or otherwise treated to remove any paint which would tend to burn and smoke during the welding process. The panel which forms the body of the wall surface being formed, is first provided with roll-formed projecting beads arranged along the edges thereof and having exteriorly facing bead edges. Thereafter, the back panel is disposed with its edges overlapping the flange sections sufficiently to cover beads therein and with beads in the panel projecting toward and in contact with the oppositely projecting interiorly facing lapped beads of the flange section. With the panels so arranged, one of a pair of electrodes can contact a portion of the contact surface on a flange section, and the other a portion of the back panel opposite a bead formed therein such that welding current applied to the electrode will effect the welding operation.

Other objects and advantages of the invention will become apparent by reference to the following specification and to the drawings.

IN THE DRAWINGS

Figure 1:
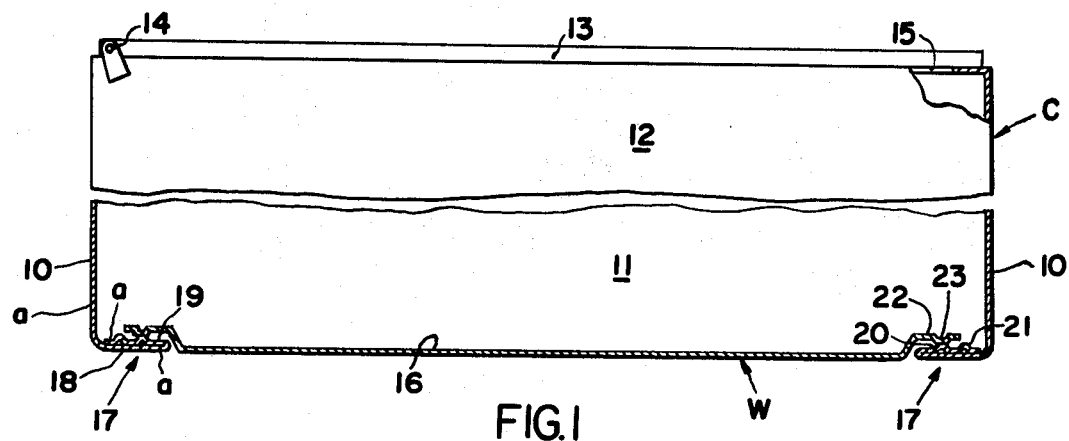
FIG. 1 is a schematic top plan view of an appliance cabinet shell, taken partly in section to illustrate the manner of securing a back panel in position.
Figures 2, 3:
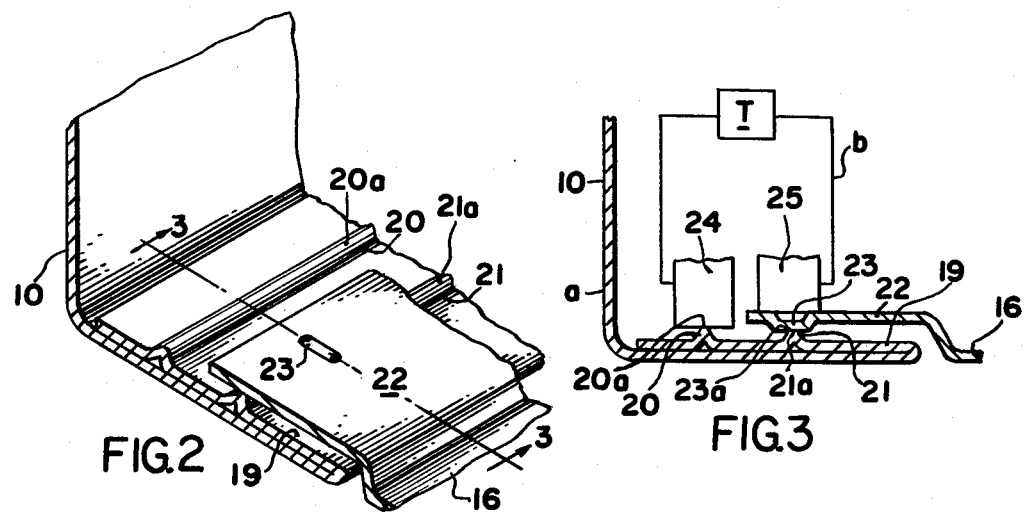
FIG. 2 is an enlarged, fragmentary, perspective facial view of a corner of the cabinet, illustrating the manner of disposing the back panel in position for welding.
FIG. 3 is a cross-sectional view taken on the line 3—3 of FIG. 2.

Referring now more particularly to the accompanying drawings, and in the first instance to FIGS. 1-3, wherein a preferred embodiment of the invention is disclosed, the letter C discloses an appliance cabinet such as a refrigerator-freezer cabinet. Cabinet C comprises a wrapper portion made up of end walls 10, a deck 11, a top wall 12, and a floor door 13 which may be hingedly connected as at 14, or in any other suitable manner, to close the door opening 15 which is conventionally provided in the front of the cabinet C. It is to be understood that FIG. 1 is a schematic view disclosing the cabinet or like article which is formed, and illustrates the manner in which a weldable part, such as a galvanized back wall 16, may be securely welded to a wrapper formed from prepainted stock. The bottom or deck 11 of the cabinet could be fabricated in a similar manner. The cabinet C is shown without insulation panels or any other appliance parts which it later may house. As indicated, the present method is directed to forming a wall W, such as the back wall of cabinet C, which it is to be understood is made up of a galvanized steel panel 16, and flange sections, generally designated 17, formed at the back of the wrapper section along the sides and upper and lower portions thereof as the marginal edge portions of a back wall. It will be noted that the marginal edge portions 17 comprise a folded over flange portion 18, and a reversely folded return portion 18, formed by folding back the outer edges of the flange portions 18. After the prepainted sheet metal steel stock is cut to length from the roll in which it is supplied, parallel beads 20 and 21 are formed in the portion to become portion 19, by conventional roll forming equipment, in a manner to face interiorly when the wrapper shell is formed in the disclosed manner with the folded back edge portions 19.

It is the outer surface of the sheet metal wrapper which is prepainted as at a, to provide a prepainted exterior surface when the flange section 19 is folded back, and this step also provides an interiorly facing prepainted surface.

The first step in forming the welded wall W then is to remove the paint from the lineal bead edges 20a and 21a, which can be done by moving them past a suitable wire brushing or grinding wheel, or in any other satisfactory manner, such as masking them at the time of painting. As will be seen, wall 16 includes indented edges 22 which are of a length to lap or cover only the bead contact surfaces 21a (bead surfaces 20a remain uncovered), when the panel 16 is disposed in position as shown in the drawings, FIGS. 1-3. Formed in the edges 22, longitudinally spaced along the edges thereof in a row, are beads 23 which face oppositely to the beads 20 and 21, and extend transversely relative thereto. These beads 23 may be described as having exteriorly facing bead contact surfaces and, since they are formed in non-painted galvanized steel material, there is no need to remove paint from the projecting contact surfaces 23a thereof, but, of course, these surfaces could be brushed or cleaned if necessary.

Because the beads 23 extend transversely to the beads 21, the positioning of panel 16 need not be extremely precise. As FIG. 3 indicates, a welding transformer T is capable of supplying welding current to an electrode 24, which is in engagement with contact surface 20a, and is in circuit b with an electrode 25 which is in contact with the edge 22 of back panel 16 at a location directly opposite a bead 23. Because of the amount of current required, and the resultant congestion of tooling, single phase DC welding current, which can be remotely mounted from the welding station, is employed to spot weld the panel 16 in position, at the location of beads 23 which, for example, may be spaced three inches apart. With the double thickness wall provided by portions 18 and 19, no burning of paint occurs and the exteriors of portions 18 of the prepainted metal wrapper remain clear of burn and blemish marks. High production rates, capable of producing 360 assemblies per hour, in a perfectly reliable manner are possible with this process.

Figures 4, 5:
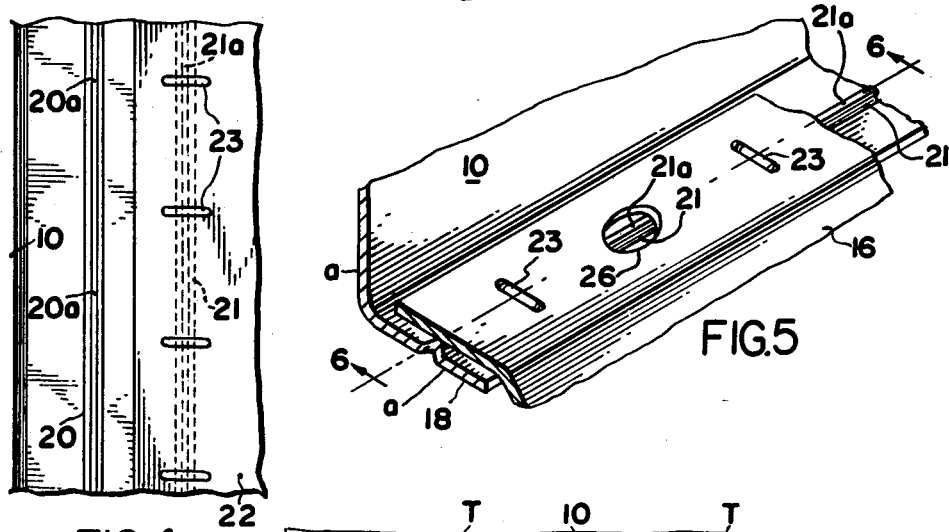
FIG. 4 is a fragmentary, facial view, taken from the interior of the welded cabinet shown in FIG. 1.
FIG. 5 is a view similar to FIG. 2, illustrating a modified process.
Figure 6:
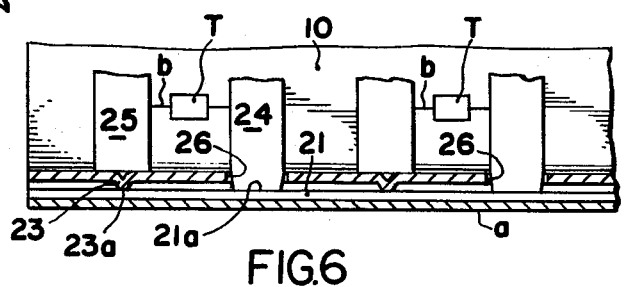
FIG. 6 is a fragmentary, cross-sectional view taken on the line 6—6 of FIG. 5.

In FIGS. 5 and 6, an alternate embodiment of the invention is employed which utilizes less metal because there is no return flange portion 19. In this modification, like parts are given identical number, so that the descriptions of the parts need not be repeated. In this embodiment, only a single bead 21 is preformed in metal flange edge 18 of wrapper 10 around the opening therein to be closed by panel 16, and here the interiorly facing contact surface 21a thereof is unpainted, and need not be wire brushed. Between the transverse beads 23, formed in the galvanized back plate 16 in the same manner as previously, enlarged openings 26 somewhat greater in diameter than electrode 24, are cut to expose the underlying contact surface 21a. With this construction, electrode 24, which contacts bead 21, can extend freely through the opening 26 without contacting panel 16, while electrode 25 with which it is connected in series is disposed axially opposite the exteriorly facing bead 23. The series circuit b is again connected through the contact surfaces 21a and 23a, and when suitable welding currents are applied, effects the resistance spot welding operation without damage to the painted surfaces a.

While two embodiments of the invention have been described, it will be apparent to those skilled in the art that the disclosed embodiment may be modified. Therefore, the foregoing description is to be considered exemplary rather than limiting, and the true scope of the invention is that defined in the following claims.

I claim:

1. A process for forming the wall of a prepainted metal cabinet or the like, such as by resistance welding a weldable panel to a prepainted appliance cabinet wrapper, having opposed side walls, painted on the exterior wall surface thereof, comprising the steps of:
    a. folding flange sections on said cabinet wrapper at generally 90° to said side walls, to function as the marginal edge portions of a wall connecting said side walls, with the folded sections being deformed to form recessed projecting bead portions therein along said edge portions with interiorly facing bead edges providing electrical contact surfaces;
    b. forming a weldable panel with projecting bead portions arranged along the edges thereof having bead edges projecting oppositely to said bead edges on the flange sections and disposing said panel in spanning relationship with the flange sections on the interior side thereof, with the edges of the panel lapping said flange sections interiorly sufficiently to cover bead portions thereon, and with bead portions in the panel projecting toward and in contact with interiorly projecting lapped bead portions in the flange sections to space the panel from the flange sections;
    c. contacting a portion of said contact surface on a flange section with one of a pair of series connected electrodes and the portion of said panel opposite a bead portion formed therein with a second electrode; and
    d. applying welding current to said electrodes.

2. The process defined in claim 1 wherein a portion of the panel is cut away to permit the first electrode to extend through the panel without contacting it and directly contact the flange section bead contact surface.

3. The process defined in claim 1 wherein a pair of parallel beads are formed in said flange sections along one of said marginal edge portions generally parallel thereto, and said panel is arranged to lap and cover only the one innermost bead on the flange section's marginal edge portion, said first electrode being in contact with contact surface on the non-covered bead.

4. The process defined in claim 1 wherein the bead portions formed in the flange sections extend crosswise to the bead portions formed in the panel.

5. The process defined in claim 3 in which the bead portions formed in the panel extend transversely lengthwise relative to the beads formed in the flange sections.

6. A process for welding prepainted metal stock to other metal stock, such as welding a galvanized steel panel to a prepainted steel refrigerated cabinet wrapper, comprising the steps of:
    a. providing flanges on said cabinet wrapper functioning as marginal edge portions of a wall, said flanges being reversely bent to provide said edge portions in at least a double wall with the sections thereof in facial contact, and one of the sections being deformed to form a pair of recessed parallel projecting longitudinal beads therein which are spaced from the section with which the deformed section is in facial contact;
    b. removing any paint from portions of the projecting bead edges;
    c. forming a panel with longitudinally spaced projecting beads arranged in a longitudinal row along edges thereof, and disposing said panel to span said flanges with its edges lapping said double wall sections sufficiently only to cover one of said parallel beads, thereby leaving the other bead free, and with the beads in the back panel projecting toward and in contact with the oppositely projecting lapped bead of the double wall sections;

d. contacting the free bead edge with one of a pair series connected electrodes and the portion of said panel opposite a bead formed therein with another electrode; and e. applying direct current welding current to said electrodes.

7. A prepainted metal appliance cabinet or like product, having a wall spanning opposed side walls formed by resistance welding a weldable panel to a prepainted appliance cabinet wrapper, painted on the exterior wall surface thereof, according to the steps of:

a. folding over flange sections on said cabinet wrapper side walls to function as the marginal edge portions of a wall connecting said side walls, with the sections having recessed projecting bead portions therein along said edge portions with interiorly facing bead edges providing electrical contact surfaces on said interiorly facing projecting bead edges;

b. forming a weldable panel with projecting bead portions arranged along the edges thereof having oppositely projecting bead edges, and disposing said panel to span said flange sections with its edges lapping said flange sections sufficiently to cover bead portions thereon, with bead portions in the panel projecting toward and in contact with the interiorly projecting lapped bead portions in the flange sections;

c. contacting a portion of said contact surface on a flange section with one of a pair of electrodes, and the portion of said panel opposite a bead portion formed therein with a second electrode; and d. applying welding current to said electrodes to effect the weld via using the beads as a portion of the circuit.

8. The product defined in claim 7 wherein an enlarged opening is cut in the panel to permit the first electrode to extend through the panel without contacting it and directly contact the flange section bead contact surface.

9. The product defined in claim 7 wherein a pair of parallel beads are formed in said flange sections along one of said marginal edge portions generally parallel thereto, and said panel is arranged to lap and cover only the one innermost bead on the flange section's marginal edge portion, said first electrode being in contact with contact surface on the non-covered bead.

10. The product defined in claim 7 wherein the bead portions formed in the flange sections extend crosswise to the bead portions formed in the panel.

11. The product defined in claim 9 in which the head portions formed in the panel extend transversely lengthwise relative to the beads formed in the flange sections.

12. A prepainted metal appliance cabinet, having a wall formed by spot welding a galvanized panel to a prepainted metal refrigerator cabinet wrapper painted only on the exterior wall surface thereof, according to the steps of:

a. folding over flange sections on said cabinet wrapper functioning as marginal edge portions of a wall, the sections being painted only on their exterior surfaces and deformed to form generally parallelly extending recessed projecting beads therein along said edge portions with interiorly facing bead edges;

b. removing any paint or other material from the interiorly facing projecting bead edges to provide contact surfaces thereon;

c. providing a non-painted weldable panel with a row of projecting beads arranged along the edges thereof crosswisely to said beads, and with exteriorly facing bead edges, and disposing said panel to span said flange sections with its edges lapping said flange sections sufficiently to cover only one of the parallel beads therein, with the beads in the back panel projecting toward and in contact with said one of the oppositely projecting lapped beads of the flange sections; and d. contacting a portion of said contact surface on a flange section with one of a pair of electrodes, and the portion of said panel opposite a bead formed therein with another electrode, while applying a direct current welding current thereto to complete a series circuit.

13. A process for forming the wall of a prepainted metal cabinet or the like, such as by resistance welding a weldable panel to a prepainted appliance cabinet wrapper, having opposed side walls, painted on the exterior wall surface thereof, comprising the steps of:

a. forming separate recessed projecting bead portions with interiorly facing bead edges in outer edge sections of said side walls and folding outer sections of said cabinet wrapper side walls which include said bead portions at generally 90° to said side walls to function as the marginal edge flange portions of a wall connecting said side walls, then folding back marginal outer edge portions of the flange sections which include said bead portions to engage the other portions of the flange sections to provide interiorly facing bead edge electrical contact surfaces;

b. disposing a weldable panel in spanning relationship with the folded back portions of the flange sections on opposed side walls on the interior side thereof, with its edges lapping said flange sections interiorly sufficiently to cover bead portions thereon;

c. contacting a portion of a contact surface on a flange section with one of a pair of series connected electrodes and the portion of said panel opposite a different contact surface with a second electrode; and d. applying welding current to said electrodes.

14. A process for forming the wall of a prepainted metal cabinet or the like, by resistance welding a weldable panel to a prepainted appliance cabinet wrapper, having opposed side walls, painted on the exterior wall surface thereof, comprising the steps of:

a. forming longitudinally extending electrical contact surface bead portions with interiorly facing bead edges in outer edge sections of said side walls, which extend substantially from end-to-end of said side walls;

b. forming a series of spaced apart cross beads in a weldable panel along the edges thereof;

c. folding outer sections of said cabinet wrapper side walls which include said bead portions at generally 90° to said side walls to function as the marginal edge flange portions of a wall connecting said side walls;

d. disposing the weldable panel in spanning relationship with flange sections on opposed side walls on the interior side of said flange sections with its edges lapping said flange sections interiorly sufficiently such that the cross beads cross-engage the longitudinally extending bead portions thereon;

e. contacting a portion of a contact surface on a flange section with one of a pair of series connected electrodes and a portion of said panel opposite a cross bead at a different location with a second electrode; and f. applying welding current to said electrodes.

15. A process for forming the wall of a prepainted metal cabinet or the like, such as by resistance welding a weldable panel to a prepainted appliance cabinet wrapper, having opposed side walls, painted on the exterior wall surface thereon, comprising the steps of:

a. folding outer sections of said cabinet wrapper side walls at generally 90° to said side walls to function as the marginal edge flange portions of a wall connecting said side walls, then folding back marginal outer edge portions of the flange sections to engage the other portions of the flange sections and provide interiorly facing electrical contact surfaces thereon;

b. forming bead portions in a weldable panel along the edges thereof;

c. disposing said weldable panel in spanning relationship with the folded back portions of the flange sections on the interior side thereof, with its edges lapping said flange sections interiorly and said bead portions protruding toward said flange sections and contact surfaces thereon;

d. contacting a portion of a contact surface on a flange section with one of a pair of series connected electrodes and the portion of said panel opposite a bead portion at a different location with a second electrode; and e. applying welding current to said electrodes.

* * * * *

UNITED STATES PATENT AND TRADEMARK OFFICE
CERTIFICATE OF CORRECTION

PATENT NO. : 4,461,943
DATED : July 24, 1984
INVENTOR(S) : Rene G. Beauvais

It is certified that error appears in the above-identified patent and that said Letters Patent are hereby corrected as shown below:

Column 2, line 36, change "floor" to -- front -- .

Column 2, line 58, change "18" to -- 19 -- .

Column 5, line 57, change "head" to -- bead -- .

Column 7, line 17, change "thereon" to -- thereof -- .

Signed and Sealed this

Eleventh Day of December 1984

[SEAL]

Attest:

GERALD J. MOSSINGHOFF

Attesting Officer  Commissioner of Patents and Trademarks